United States Patent [19]

Merrill et al.

[11] Patent Number: 5,552,489
[45] Date of Patent: Sep. 3, 1996

[54] TACKIFIERS AND A PROCESS TO OBTAIN TACKIFIERS

[75] Inventors: Natalie A. Merrill, Deer Park; James M. Farley, League City, both of Tex.; Martha H. Robertson, Jackson; Charles L. Sims, Baton Rouge, both of La.; Richard B. Pannell, Kingwood, Tex.; Angelo A. Montagna, Houston, both of Tex.

[73] Assignee: Exxon Chemical Patents Inc., Wilmington, Del.

[21] Appl. No.: 378,302

[22] Filed: Jan. 25, 1995

Related U.S. Application Data

[63] Continuation of Ser. No. 278,768, Jul. 22, 1994, abandoned.

[51] Int. Cl.$^6$ .......................... C08L 45/00; C08F 232/04; C08F 232/08
[52] U.S. Cl. .............. 525/210; 525/97; 525/98; 525/211; 525/216; 525/339; 526/126; 526/127; 526/134; 526/160; 526/170; 526/281; 526/282; 526/283; 526/308; 524/553; 524/554; 156/334
[58] Field of Search .................. 526/126, 127, 526/134, 160, 169.2, 287, 282, 283, 308, 161, 170; 525/88, 97, 210, 211, 216, 339, 98; 524/553, 554; 156/334

[56] References Cited

U.S. PATENT DOCUMENTS

| | | | |
|---|---|---|---|
| 3,467,637 | 9/1969 | Prucnal | 526/169.2 |
| 3,862,068 | 1/1975 | Russell | 525/97 X |
| 3,926,878 | 12/1975 | Shimizu et al. | |
| 3,966,690 | 6/1976 | Mathews et al. | 526/283 |
| 4,010,130 | 3/1977 | Matsuo et al. | |
| 4,286,077 | 8/1981 | St. Clair et al. | 525/97 X |
| 4,288,567 | 9/1981 | Feeney et al. | 525/97 X |
| 5,003,019 | 3/1991 | Ishimaru et al. | |
| 5,008,356 | 4/1991 | Ishimaru et al. | |
| 5,059,487 | 10/1991 | Muro et al. | 525/97 X |
| 5,087,677 | 2/1992 | Brekner et al. | |
| 5,191,052 | 3/1993 | Welborn, Jr. | |
| 5,194,500 | 3/1993 | Chin et al. | 525/97 |
| 5,241,025 | 8/1993 | Hlatky et al. | |
| 5,324,801 | 6/1994 | Brekner et al. | |

FOREIGN PATENT DOCUMENTS

| | | |
|---|---|---|
| 283164 | 9/1988 | European Pat. Off. . |
| 0407870A2 | 1/1991 | European Pat. Off. . |
| 501370A1 | 1/1992 | European Pat. Off. . |
| 0504418 | 9/1992 | European Pat. Off. . |
| 63-230707 | 9/1988 | Japan . |
| WO91/13106 | 9/1991 | WIPO . |

OTHER PUBLICATIONS

Seymour et al., Polymer Chemistry . . . (2d ed.) Mercel Dekker, Inc., N.Y., 93–97, 1988.

*Primary Examiner*—Fred Teskin
*Attorney, Agent, or Firm*—Catherine L. Bell; Frank E. Reid

[57] ABSTRACT

Tackifiers having Mn's of 5,000 or less and Tg's above 0° C. are produced by combining a single site catalyst with an alpha-olefin and a cyclic monomer under conditions designed to produce low molecular weight.

33 Claims, No Drawings

TACKIFIERS AND A PROCESS TO OBTAIN TACKIFIERS

This is a continuation of application Ser. No. 08/278,768, filed Jul. 22, 1994 abandoned.

FIELD OF THE INVENTION

This invention relates to tackifiers and a novel process to produce tackifiers using single site catalysts such as vanadium catalysts or cyclopentadienyl transition metal compounds or derivatives thereof in combination with non-coordinating anions or alumoxanes.

BACKGROUND OF THE INVENTION

There are many ways known in the art to produce tackifiers such as the Friedel Crafts polymerization of hydrocarbon resin streams containing cycloolefins and olefins and the like. However, until now there has been no practical way to selectively produce tackifiers with an olefin polymerization catalyst. Most olefin polymerization catalysts do not easily produce polymers with low enough molecular weight to be useful for use as a tackifier and with glass transition temperatures (Tg) high enough for use as a tackifier. Most olefin catalyst systems produce high molecular weight polyolefins and even if they produce low molecular weight product, it is generally low molecular weight, low Tg oligomers having little value for certain tackifier applications. Examples of such include the cationic polymerization of isobutylene. Likewise, U.S. Pat. No. 3,470,145 discloses polymerizing α-olefins having 11–18 carbon atoms and β-pinene to provide tackifiers for EPDM rubbers using a $TiCl_4$/$Al(isoC_4H_9)_3$ catalyst. Furthermore, it is known under the Fox-Flory relationship that as a general rule that when molecular weight decreases so does Tg (see T. G. Fox J.Polym. Sci. 15, 371–390(1955)). The instant invention, however, provides new tackifiers with low molecular weights and high Tg's and a method to produce said low molecular weight polymers with high Tg's. Low molecular weight is desired for compatibility and high Tg is desired for strength. The instant invention also provides compatible blends based upon the tackifiers produced herein for use in certain adhesive applications.

SUMMARY OF THE INVENTION

This invention relates to olefin copolymer tackifiers having molecular weights (Mn) less than or equal to about 5,000 and glass transition temperatures (Tg) greater than or equal to about 0° C. and less than about 100° C., preferably greater than or equal to about 30° C. and less than about 85° C., even more preferably greater than or equal to about 45° C. In a preferred embodiment the olefin copolymer tackifier is amorphous and compatible with the polymer to be tackified. (Amorphous is defined to be a polymer lacking a defined melting point or melting transition. Non-crystalline is defined to mean containing 10% crystallinity or less Compatible as used herein means that the tackifier will associate with at least one phase of the base polymer to be tackified.). This invention further relates to a process to produce tackifiers comprising contacting an α-olefin monomer and a cyclic monomer with a single site catalyst system such as a vanadium catalyst system or a cyclopentadienyl transition metal compound or derivatives thereof combined with an alumoxane or a non-coordinating anion in a polymerization reactor under polymerization conditions selected to produce a polymer having a number average molecular weight less than about 5,000 and a Tg greater than or equal to about 0° C. and less than about 100° C., preferably greater than or equal to about 20° C. and less than about 85° C., even more preferably greater than or equal to about 30° C., even more preferably greater than or equal to about 45° C. For purposes of this invention and any claims appended thereto, the term "α-olefin" shall include ethylene and the phrase "cyclopentadienyl transition metal compound or derivatives thereof" shall include bridged and unbridged compounds as well as substituted and unsubsitiuted fused ring systems and derivatives thereof.

DETAILED DESCRIPTION OF PREFERRED EMBODIMENTS

This invention relates to tackifiers having number average molecular weights below about 5,000, preferably below about 2,000 even more preferably below about 1,200, even more preferably between about 750 and about 300 and having glass transition temperatures of about 0° C. or more, preferably about 20° C. or more, even more preferably about 30° C. or more, even more preferably about 45° C. or more. In particular, this invention also relates to a process for obtaining tackifiers comprising contacting cyclic olefins and alpha olefins with single site catalysts in solution, bulk or slurry phase under polymerization conditions to obtain a low molecular weight polymer. The polymers produced herein preferably have about 10 mole % or more incorporation of cyclic comonomer, more preferably about 20 mole % to about 95 mole % incorporation, even more preferably 35 mole % to about 95 mole % incorporation of cyclic comonomer Preferred single site catalysts include vanadium catalysts and cyclopentadienyl transition metal compounds or derivatives thereof, combined with an alumoxane or a non-coordinating anion. Catalysts which are useful in the practice of the invention comprising cyclopentadienyl transition metal compounds or derivatives thereof in combination with a non-coordinating anion or alumoxane are disclosed and described in the following publications:

| ID number | Publication/ issue date |
| --- | --- |
| US 5,055,438 | 10-18-91 |
| US 5,507,475 | 10-15-91 |
| US 5,096,867 | 3-17-92 |
| WO 9200333 | 1-9-92 |
| EPA 520,732 | 12-30-92 |
| US 5,264,405 | 11-23-93 |
| EPA 129,368 | 12-27-84 |
| CA 1268753 | 5-8-90 |
| US 5,017,714 | 5-21-90 |
| US 5,240,894 | 8-31-93 |
| US 5,198,401, | 3-30-93 |
| US 5,153,157 | 10-6-92 |
| EPA 277,003 & 277,004 | 6-3-88 |
| WO 9403506 | 2-17-94 | which are all incorporated by reference herein.

Preferred catalyst systems include but are not limited to alumoxane, such as methylalumoxane, or a non-coordinating anion, such as dimethylanilinium tetrakis(pentafluorophenyl) boron, used in combination with one or more of the following:
dimethylsilanyl bis(methylcyclopentadienyl)zirconium dichloride; dimethylsilanyl bis(cyclopentadienyl)zirconium dichloride; bis(methylcyclopentadienyl)zirconium dichloride; bis(cyclopentadienyl)zirconium dichloride; dimethylsilanyl bis(tetrahydroindenyl)zirconium dichloride; rac-dimethylsilyl-bis(tetrahydroindenyl)zirconium dimethyl; dimethylsilanyl bis(methylcyclopentadienyl)zirconium dimethyl; dimethylsilanyl bis(cyclopentadienyl)zirconium dimethyl; bis(methylcyclopentadienyl)zirconium dimethyl; bis(cyclopentadienyl)zirconium dimethyl; Me$_2$Si [Me$_4$CpN(C$_{12}$H$_{23}$)]TiCl$_2$; and CpZr(OC(CH$_3$)$_3$)Cl$_2$.

Preferred monomers that may be polymerized to produce tackifiers by this process include alpha-olefins which may be any C$_2$ to C$_{20}$, preferably a C$_2$ to C$_8$ alpha-olefin, with ethylene and propylene being particularly preferred alpha-olefins, and any cyclic comonomer, preferably dicyclopentadiene, cyclopentadiene, norbornene, ethylidene norbornene, ethylene norbornene, vinyl norbornene, methylcyclopentadiene, cyclopentadiene and the like or substituted versions or derivatives thereof. For the sake of brevity, some of the many cyclic monomers that are capable of being polymerized by the above catalysts are represented by the formulae below.

In general, any cycloolefin can be copolymerized with an olefin in the present process. In a preferred embodiment the "cyclic olefin" is a dimer or a trimer of the cyclic comonomer, wherein the dimer or trimer retains at least one polymerizable olefinic unsaturation. The cycloolefin includes cyclized ethylenic or acetylenic unsaturation which polymerizes in the presence of the metallocene catalyst substantially by insertion polymerization, generally without ring opening, so that the ring structure in which the unsaturation is present is incorporated into the polymer backbone. Suitable cycloolefins generally correspond to one of the formulae:

1.

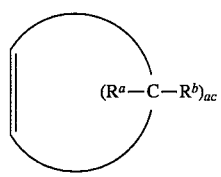

2.

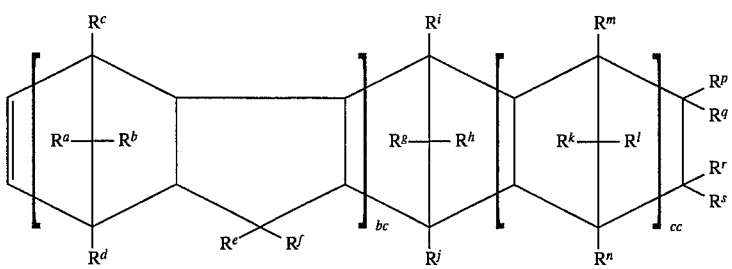

3.

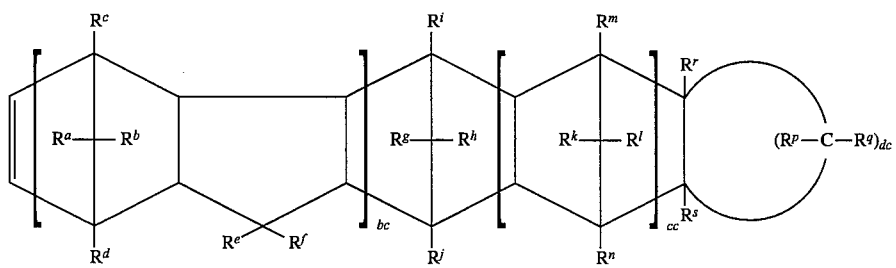

4.

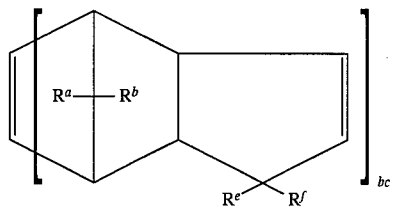

wherein each $R^a$ through $R^s$ is independently hydrogen, halogen, hydrocarbyl, or halohydrocarbyl; ac and dc are integers of 2 or more, and bc and cc are integers of 0 or more. Specific representative cycloolefins according to formula 1 are cyclobutene, cyclopentene, 3-methylcyclopentene, 4-methylcyclopentene, 3,4-dimethylcyclopentene, 3,5-dimethylcyclopentene, 3-chlorocyclopentene, cyclohexene, 3-methylcyclohexene, 4-methylcyclohexane, 3,4-dimethylcyclohexene, 3-chlorocyclohexene, cycloheptene, cyclododecene and the like. Preferred monocycloolefins according to formula 1 have from 4 to 12 carbon atoms, more preferably 6 to 10 carbon atoms.

Cycloolefins according to formulae 2, 3 and 4 can be prepared by condensing cyclopentadienes with the corresponding olefins and/or cycloolefins in a Diels-Alder reaction. Specific representative cycloolefins according to formula 2 are as follows:

bicyclo(2.2.2)hept-2-ene;
6-methylbicyclo(2.2.1)hept-2-ene;
5,6-dimethylbicyclo(2.2.1)hept-2-ene;
1-methylbicyclo(2.2.1)hept-2-ene;
6-ethylbicyclo(2.2.1)hept-2-ene;
6-n-butylbicyclo(2.2.1)hept-2-ene;
6-isobutylbicyclo(2.2.1)hept-2-ene;
7-methylbicyclo(2.2.1)hept-2-ene;
5-phenylbicyclo(2.2.1)hept-2-ene;
5-methyl-5-phenylbicyclo(2.2.1)hept-2-ene;
5-benzylbicyclo(2.2.1)hept-2-ene;
5-tolylbicyclo(2.2.1)hept-2-ene;
5-ethylphenylbicyclo(2.2.1)hept-2-ene;
5-isopropylphenylbicyclo(2.2.1)hept-2-ene;
5-alpha•-naphthylbicyclo(2.2.1)hept-2-ene;
5-acetoracenylbicyclo(2.2.1)hept-2-ene;
tetracyclo(4.4.0.1$^{2,5}$.1$^{7,10}$)-3-dodecene;
2-methyltetracyclo(4.4.0.1$^{2,5}$.1$^{7,10}$)-3-dodecene;
2-ethyltetracyclo(4.4.0.1$^{2,5}$.1$^{7,10}$)-3-dodecene;
2-propyltetracyclo(4.4.0.1$^{2,5}$.1$^{7,10}$)-3-dodecene;
2-hexyltetracyclo(4.4.0.1$^{2,5}$.1$^{7,10}$)-3-dodecene;
2-stearyltetracyclo(4.4.0.1$^{2,5}$.1$^{7,10}$)-3-dodecene;
2,3-dimethyltetracyclo(4.4.0.1$^{2,5}$.1$^{7,10}$)-3-dodecene;
2-methyl-3-ethyltetracyclo(4.4.0.1$^{2,5}$.1$^{7,10}$)-3-dodecene;
2-chlorotetracyclo(4.4.0.1$^{2,5}$.1$^{7,10}$)-3-dodecene;
2-bromotetracyclo(4.4.0.1$^{2,5}$.1$^{7,10}$)-3-dodecene;
2,3-dichlorotetracyclo(4.4.0.1$^{2,5}$.1$^{7,10}$)-3-dodecene;
2-cyclohexyltetracyclo(4.4.0.1$^{2,5}$.1$^{7,10}$)-3-dodecene;
2-n-butyltetracyclo(4.4.0.1$^{2,5}$.1$^{7,10}$)-3-dodecene;
2-isobutyltetracyclo(4.4.0.1$^{2,5}$.1$^{7,10}$)-3-dodecene;
5,10-dimethyltetracyclo(4.4.0.1$^{2,5}$.1$^{7,10}$)-3-dodecene;
2,10-dimethyltetracyclo(4.4.0.1$^{2,5}$.1$^{7,10}$)-3-dodecene;
11,12-dimethyltetracyclo(4.4.0.1$^{2,5}$.1,$^{7,10}$)-3-dodecene;
2,7,9-trimethyltetracyclo(4.4.0.1$^{2,5}$.1$^{7,10}$)-3-dodecene;
9-ethyl-2,7-dimethyltetracyclo(4.4.0.1$^{2,5}$.1$^{7,10}$)-3-dodecene;
9-isobutyl-2,7-dimethyltetracyclo(4.4.0.1$^{2,5}$.1$^{7,10}$)-3-dodecene;
9,11,12-trimethyltetracyclo(4.4.0.1$^{2,5}$.1$^{7,10}$)-3-dodecene;
9-ethyl-11,12-dimethyltetracyclo(4.4.0.1$^{2,5}$.1$^{7,10}$)-3-dodecene;
9-isobutyl-11,12-dimethyltetracyclo (4.4.0.1$^{2,5}$.1$^{7,10}$)-3-dodecene;
5,8,9,10-tetramethyltetracyclo(4.4.0.1$^{2,5}$.1$^{7,10}$)-3dodecene;
8-methyltetracyclo(4.4.0.1$^{2,5}$.1$^{7,10}$)-3-dodecene;
8-ethyltetracyclo(4.4.0.1$^{2,5}$.1$^{7,10}$)-3-dodecene;
8-propyltetracyclo(4.4.0.1$^{2,5}$.1$^{7,10}$)-3-dodecene;
8-hexyltetracyclo(4.4.0.1$^{2,5}$.1$^{7,10}$)-3-dodecene;
8-stearyltetracyclo(4.4.0.1$^{2,5}$.1$^{7,10}$)-3-dodecene;
8,9-dimethyltetracyclo(4.4.0.1$^{2,5}$.1$^{7,10}$)-3-dodecene;
8-methyl-9-ethyltetracyclo(4.4.0.1$^{2,5}$.1$^{7,10}$)-3-dodecene;
8-chlorotetracyclo(4.4.0.1$^{2,5}$.1$^{7,10}$)-3-dodecene;
8-bromotetracyclo(4.4.0.1$^{2,5}$.1$^{7,10}$)-3-dodecene;
8-fluorotetracyclo(4.4.0.1$^{2,5}$.1$^{7,10}$)-3-dodecene;
8,9-dichlorotetracyclo(4.4.0.1$^{2,5}$.1$^{7,10}$)-3-dodecene;
8-cyclohexyltetracyclo(4.4.0.1$^{2,5}$.1$^{7,10}$)-3-dodecene;
8-isobutyltetracyclo(4.4.0.1$^{2,5}$.1$^{7,10}$)-3-dodecene;
8-butyltetracyclo(4.4.0.1$^{2,5}$.1$^{7,10}$)-3-dodecene;
8-ethylidenetetracyclo(4.4.0.1$^{2,5}$.1$^{7,10}$)-3-dodecene;
8-ethylidene-9-methyltetracyclo(4.4.0.1$^{2,5}$.1$^{7,10}$)-3-dodecene;
8-ethylidene-9-ethyltetracyclo(4.4.0.1$^{2,5}$.1$^{7,10}$)-3-dodecene;
8-ethylidene-9-isopropyltetracyclo(4.4.0.1$^{2,5}$.1$^{7,10}$)-3-dodecene;
8-ethylidene-9-butyltetracyclo(4.4.0.1$^{2,5}$.1$^{7,10}$)-3-dodecene;
8-n-propylidenetetracyclo(4.4.0.1$^{2,5}$.1$^{7,10}$)-3-dodecene;
8-n-propylidene-9-methyltetracyclo (4.4.0.1$^{2,5}$.1$^{7,10}$)-3-dodecene;
8-n-propylidene-9-ethyltetracyclo(4.4.0.1$^{2,5}$.1$^{7,10}$)-3-dodecene;
8-n-propylidene-9-isopropyltetracyclo (4.4.0.1$^{2,5}$.1$^{7,10}$)-3-dodecene;
8-n-propylidene-9-butyltetracyclo(4.4.0.1$^{2,5}$.1$^{7,10}$)-3-dodecene;
8-isopropylidenetetracyclo(4.4.0.1$^{2,5}$.1$^{7,10}$)-3-dodecene;
8-isopropylidene-9-methyltetracyclo(4.4.0.1$^{2,5}$. 1$^{7,10}$)-3-dodecene;
8-isopropylidene-9-ethyltetracyclo(4.4.0.1$^{2,5}$. 1$^{7,10}$)-3-dodecene;
8-isopropylidene-9-isopropyltetracyclo(4.4.0.1$^{2,5}$. 1$^{7,10}$)-3-dodecene;
8-isopropylidene-9-butyltetracyclo(4.4.0.1$^{2,5}$. 1$^{7,10}$)-3-dodecene;
hexacyclo(6.6.1.1$^{3,6}$.1$^{10,13}$.0$^{2,7}$.0$^{9,14}$)-4-heptadecene;
12-methylhexacyclo(6.6.1.1$^{3,6}$.1$^{10,13}$.0$^{2,7}$.0$^{9,14}$)-4-heptadecene;
12-ethylhexacyclo(6.6.1.1$^{3,6}$.1$^{10,13}$.0$^{2,7}$.0$^{9,14}$)-4-heptadecene;
12-isobutylhexacyclo(6.6.1.1$^{3,6}$.1$^{10,13}$.0$^{2,7}$.0$^{9,14}$)-4-heptadecene;
1,6,10-trimethyl-12-isobutylhexacyclo (6.6.1.1$^{3,6}$.1$^{10,13}$.0$^{2,7}$.0$^{9,14}$)-4-heptadecene;
octacyclo(8.8.0.1$^{2,9}$.1$^{4,7}$.1$^{11,18}$.1$^{13,16}$.0$^{3,8}$. 0$^{12,17}$)-5-docozene;
15-methyloctacyclo(8.8.0.1$^{2,9}$.1$^{4,7}$.1$^{11,18}$.1$^{13,16}$. 0$^{3,8}$.0$^{12,17}$)-5-docozene; and
15-ethyloctacyclo(8.8.0.1$^{2,9}$.1$^{4,7}$.1$^{11,18}$.1$^{13,16}$. 0$^{3,8}$.0$^{12,17}$)-5-docozene.

Specific representative cycloolefins according to formula 3 are as follows:
tricyclo(4.3.0.1$^{2,5}$)-3-decene;
2-methyltricyclo(4.3.0.1$^{2,5}$)-3-decene;
5-methyltricyclo(4.3.0.1$^{2,5}$)-3-decene;
tricyclo(4.4.0.1$^{2,5}$)-3-undecene;
10-methyltricyclo(4.4.0.1$^{2,5}$)-3-undecene;
pentacyclo(6.5.1.1$^{3,6}$.0$^{2,7}$.0$^{9,13}$)-4-pentadecene;
pentacyclo(4.7.0.1$^{2,5}$.0$^{8,13}$. 1$^{9,12}$)-3-pentadecene;
methyl-substituted pentacyclo(4.7.0.1$^{2,5}$.0$^{8,13}$.1$^{9,12}$)-3-pentadecene;
1,3-dimethylpentacyclo(6.5.1.1$^{3,6}$.0$^{2,7}$.0$^{9,13}$)-4-pentadecene;
1,6-dimethylpentacyclo(6.5.1.1$^{3,6}$.0$^{2,7}$.0$^{9,13}$)-4-pentadecene;
14,15-dimethylpentacyclo(6.5.1.1$^{3,6}$.0$^{2,7}$.0$^{9,13}$)-4-pentadecene;
pentacyclo(6.6.1.1$^{3,6}$.0$^{2,7}$.0$^{9,14}$)-4-hexadecene;
1,3-dimethylpentacyclo(6.6.1.1$^{3,6}$.0$^{2,7}$.0$^{9,14}$)-4-hexadecene;
1,6-dimethylpentacyclo(6.6.1.1$^{3,6}$.0$^{2,7}$.0$^{9,14}$)-4-hexadecene;
15,16-dimethylpentacyclo(6.6.1.1$^{3,6}$.0$^{2,7}$.0$^{9,14}$)-4-hexadecene;
heptacyclo(8.7.0.1$^{2,9}$.1$^{4,7}$.1$^{11,17}$.0$^{3,8}$.0$^{12,16}$)-5-eicosene;
heptacyclo(7.8.0.1$^{3,6}$.0$^{2,7}$.1$^{10,17}$.0$^{11,16}$.1$^{12,13}$)-4-eicosene;
heptacyclo(8.8.0.1$^{2,9}$.1$^{4,7}$.1$^{11,18}$.0$^{3,8}$.0$^{12,17}$)-5-heneicosene;
nonacyclo(9.10.1.1$^{4,7}$.0$^{3,8}$.0$^{2,18}$.0$^{12,21}$.1$^{13,20}$. 0$^{14,19}$.1$^{15,18}$)-5-pentacosene;
1,4-methano-1,1a,4,4a-tetrahydrofluorene;
1,4-methano-1,1a,4,4a,5,10a-hexahydroanthracene; and
cyclopentadiene-acenaphthylene adduct.

Suitable cycloolefins also include cyclic and polycyclic non-conjugated dienes and trienes having a cyclized carbon-carbon double bond which is polymerizable. Specific representative examples of such cyclopolyenes include the following:

ethylene norbornene
5-vinyl-2-norbornene
5-ethylidene-2-norbornene
dicyclopentadiene;
tricylopentadiene;
4-methylcyclo-1,4-octadiene;
4-methyl-5-propylcyclo-1,4-octadiene;
5-methylcyclopentadiene;
4-methyl-5-ethyldicyclopentadiene;
5-isopropyldicyclopentadiene;
1,5,9-cyclododecatriene;
2-methyl-2,5-norbornadiene;
5-methyl-2,5-norbornadiene;
2-propyl-2,5-norbornadiene;
3-heptyl-2,5-norbornadiene;
2-ethyl-3-propyl-2,5-norbornadiene;
2-(1'5'-dimethylhexene-4-yl)-2,5-norbornadiene;
2-ethylbicyclo(2.2.2)-2,5-octadiene;
2-methyl-3-ethyl-bicyclo(2.2.2)-2,5-octadiene;
2-hexylbicyclo(2.2.2)-2,5-octadiene;
2-(1',5'-dimethylhexenyl-4)bicyclo(2.2.2)-2,5-octadiene;
1-isopropylidenebicyclo(4.4.0)-2,6-decadiene;
3-ethylenebicyclo(3.2.0)-2,6-heptadiene;
3-methylbicyclo(3.3.0)-2,6-octadiene;
pentacyclo(6.5.1.1$^{3,6}$.0$^{2,7}$.0$^{9,13}$)-4,10-pentadocadiene;
3-methyl-4,7,8,9-tetrahydroindene;
6-methyl-4,7,8,9-tetrahydroindene; and
2-propyl-4,7,8,9-tetrahydroindene.

When dicyclopentadiene (or a similar cyclopolyene) is employed, it may used in either the endo form, the exo form or both. When the cycloolefin is a cyclic diene or triene, the resulting copolymer can contain pendant cyclized double bonds which are potential sites for functionalization, hydrogenation, derivatization, cross-linking, etc.

Process Conditions

The catalyst and monomers are usually combined under solution, bulk or slurry process conditions.

In a solution process, the catalyst components and the monomers are usually suspended or dissolved in a solvent and introduced into a reaction vessel. Temperatures range from 0° to 250° C., preferably 20° to 175° C., even more preferably 60° to 120° C. and pressures run from atmospheric pressure up to about 4,000 psi (28 MPa). The instant processes typically run according to solution protocols known to those of ordinary skill in the art. Preferred solvents include but are not limited to aliphatic hydrocarbon solvents, parafinnic solvents and the like. Examples include 2-methylpentane, isopentane, Isopar™, a hydrocarbon solvent available from Exxon Chemical Company, benzene, toluene and the like. In addition the polymerization can be performed without solvent, such as in bulk polymerizations using standard techniques known in the art.

To obtain tackifiers from the polymerization catalyst systems and conditions described above, one will select conditions that will produce low molecular weight and preferably high comonomer incorporation. Conditions that will produce low molecular weight include:

(1) using very high temperatures to increase the incidence of chain transfer or chain termination;

(2) introducing chain transfer agents, such as hydrogen, into the polymerization reactor to force chain transfer;

(3) increasing the ratio of alumoxane activator present relative to the cyclopentadienyl compound to cause to the formation of low molecular weight oligomer and formation of low molecular weight product; and (4) using large or excess quantities of cyclic comonomer (as compared to the α-olefin content) with catalysts known to produce tactic, high molecular weight polymer; and (5) varying the catalyst concentration and the monomer feed ratios. For example an increase in catalyst concentration can lead to low Mn product as the monomer is quickly exhausted. In addition, by increasing the concentration of monomer capable of readily under going beta-hydride elimination, low Mn product can also be obtained.

In a preferred embodiment to obtain low molecular weight, the alumoxane is combined with the cyclopentadienyl transition metal compound or derivative thereof in an aluminum to metal ratio of 1,500:1 to 3000:1. This does not mean that one of ordinary skill in the art could not run the reaction at a ratio of 500:1 or less, however, if one did wish to use that ratio of catalyst, one would use other methods to limit molecular weight. If the aluminum to metal ratio is low other factors such as temperature, presence of hydrogen, and the like will control Mn.

Heretofore the above low molecular weight conditions were known to produce low comonomer incorporation and low Tg's in conjunction with the low molecular weight. In the instant invention, however, the use of the single site catalysts enables one to achieve high comonomer incorporation and high Tg's in spite of the low molecular weight.

Thus in the practice of this invention one of ordinary skill in the art will also use conditions known to promote comonomer incorporation including but not limited to feeding higher volumes of comonomer into the reactor.

Thus, for example, if one of ordinary skill in the art chose a single site catalyst known to produce high molecular weight isotactic polymer then more comonomer could be used relative to the monomer optionally in conjunction with hydrogen so as to produce a lower molecular weight amorphous polymer with high comonomer content, rather than a high molecular weight isotactic crystalline polymer. In contrast if a catalyst known to produce amorphous polymer is selected, then one of ordinary skill in the art would use methods such as increasing the reaction temperature to produce the desired low Mn High Tg polymer. As one can surmise depending on the catalyst polymerization condition choices a variety of polymers can be produced that have low Mn and high Tg.

The tackifiers produced with the processes described above are generally amorphous in that they lack defined melting points. Likewise the tackifiers produced herein typically comprise anywhere from at least about 5 mole % to about 95 mole % of a cyclic comonomer and have molecular weights of about 300 to about 5000 Mn. Furthermore, in a preferred embodiment these tackifiers have low color. Most tackifiers have colors between 3 and 7 on the Gardner scale, as measured by ASTM 1544-68. However the tackifiers produced according to this invention have Saybolt colors of +15 or higher, preferably +20 or higher, as measured by ASTM 156. Thus these tackifiers are significantly lighter in color than normal unmodified tackifiers. Both ASTM 156 and ASTM 1544-68 are incorporated by reference herein.

The tackifiers of this invention can be combined with other polymers to produce adhesive compositions. Such other polymers may be plastics, thermoplastics, elastomers, plastomers or combinations thereof. Preferred other polymers ("base polymers") include homo-, co-, ter- and/or tetra-polymers of olefins such as α-olefins, acrylics, acrylates, acetates, and the like. Typical base polymers which can be combined with the tackifiers produced herein include but are not limited to polyethylene, polypropylene, ethylene-vinyl acetate, polyvinyl chloride, natural rubber, nitrile rubber, polychloroprene rubber, ethylene-propylene rubber, ethylene-propylene-diene termonomer rubber, polyisobutylene elastomers, silicone, polyurethane, polybutadiene, Butyl rubber, polystyrene, isoolefin-paraalkyl-styrene copolymers.

Block copolymers are also excellent base polymers for the tackifiers produced herein. Styrene based block copolymers are a preferred class of base polymers, particularly block copolymers comprising styrenic blocks and diene blocks in an A—B—A or $(A)_nB$ configuration. A is preferably poly(styrene) or poly(substituted styrene) block and B is preferably a polymer of a $C_3$ to $C_{30}$ diene, preferably isoprene and/or butadiene. Such polymers are commercially available under the trades names KRATON 1107™, KRATON 1101™, VECTOR 4111™ and VECTOR 4411™, VECTOR 4461™. Other grades of KRATON™ and VECTOR™ polymers are also useful for blending with the tackifiers produced herein. (KRATON™ and VECTOR™ polymers are available from Shell and DEXCO Polymers, respectively.)

The tackifier and the base polymer can be combined to produce a variety of adhesives, such as hot melt adhesives, pressure sensitive adhesives, hot melt pressure sensitive adhesives, structural adhesives and the like. For example, the tackifier may be combined with the base polymer at levels of 50 to 150 parts by weight of the tackifier to 100 parts of the base polymer to obtain a pressure sensitive adhesive. In a preferred embodiment and depending on the application desired, the tackifier can be present in combination with the base polymer at anywhere from 1 part by weight to 300 parts by weight of tackifier per 100 parts base polymer. In addition additives may be present in the adhesive compositions. Typical additives include, dyes, pigments, fillers, waxes, plasticizers, antioxidants, heat stabilizers, light stabilizers, additional tackifiers and the like. In a preferred embodiment oil and or plasticizer is present at up to 30 phr, preferably from about 5 to about 25 phr.

The copolymers of this invention can also be used as adjuvants in adhesive compositions replacing the typically used oils in adhesive compositions.

The adhesives produced as described above are then applied as a coating or film onto paper, corrugated paper, polyolefins, polyolefin films, polyesters, polyester films, metals, glass, thermoplastics, plastics, elastomers, thermoplastic elastomers(TPE's), natural substances such as wood and pulp; fabric, melt blown or spun bonded plastics and the like. These adhesive compositions on a backing can then be applied to substrates which can be any of the above. The adhesives can then be used in tapes and labels, diapers feminine products, book binders and non-wovens. Likewise the adhesives described above may be formulated into pressure sensitive adhesives, hot melt adhesives, hot melt pressure sensitive adhesive and the like.

The following examples demonstrate the invention and are not intended to limit it in any manner.

EXAMPLES

| CATALYSTS | |
|---|---|
| Transition Metal Compound (TMC) | Composition |
| A | $Me_2Si[Me_4CpN(C_{12}H_{23})]TiCl_2$ |
| B | $Me_2Si(H_4Ind)_2ZrCl_2$ |
| C | $CpZr(OC(CH_3)_3)Cl_2$ |
| D | $Cp_2ZrCl_2$ |

| CATALYSTS -continued | |
|---|---|
| Transition Metal Compound (TMC) | Composition |
| E | $(MeCp)_2ZrCl_2$ |
| F | $Me_2SiCp_2ZrCl_2$ |
| G | $Me_2Si(MeCp)_2ZrCl_2$ |

Me = methyl, Cp = cyclopentadienyl, Ind = indenyl.

| Tests and Standards | |
|---|---|
| Property | Test/Standard |
| Mole % Incorporation | $H^1$ NMR |
| Glass Transition Temperature (Tg) | ASTM E 1356 (Differential Scanning Calorim at a heating rate of 5° C./min) |
| Ring and Ball Softening point | ASTM E-28 |
| Rolling Ball Tack | PSTC-6 (ASTM D 3121) |
| 180° Peel | PSTC-1 |
| Shear Adhesion Fail Temperature (SAFT) | ASTM D 4498 |
| Mw and Mn | GPC (Gel Permeation Chromotography)[a] |
| Loop Tack | method described below |
| Holding Power | PSTC #7 |

(PSTC = Pressure Sensitive Tape Council)
(ASTM = American Society of Testing and Materials)
[a]GPC data obtained on a Waters 150° C. equipped with 2 Shodex mixed bed columns (KF80MS) and 2 Phenomenex (500 Å and 100 Å) columns in THF at the flow rate of 1 ml/min and at 45° C. All other GPC data were obtained on a Waters 590/712 WISP equipped with Polymer Labs Mixed D, $10^4$ Å, 500 Å, and 50 Å columns in THF. Both instruments were equipped with RI detectors and GPC values reported are polystyrene equivalent molecular weights.

Loop tack involves contacting an adhesive tape surface to a solid substrate and measuring the force required to separate the adhesive tape and the solid substrate using the following technique. Test specimens are cut from standard films to 1×9 (2.54 cm×22.9 cm) dimensions. A loop is made out of test strip with the adhesive side out and the ends are attached using masking tape. Tests are run at standard conditions of 23° C.±2° C. and 50% humidity. Stainless steel substrate panels (2×5×1/16 (5.08 cm×6.45 cm×0.16 cm)) are used and each test is prepared individually and tested immediately (within one minute). An Instron is prepared for the testing by attaching a 90° Quick Stick jig to the lower jaw of the Instron. A clean stainless steel panel is placed in the test jig. The ends of a test loop are attached in the top jaw of the Instron and the loop is lowered onto the test panel at the rate of 2/min (5.08 cm/min) until approximately 5(12.7 cm) of test specimen is in contact with the panel. The adhesive tape contacts the stainless steel substrate with no pressure other than the weight of the tape itself. The test specimen is then pulled at the rate of 2/min. Average loop values are reported in lbs/inch for a minimum of three determinations.

EXAMPLES 1–9

Examples 1–9 were run according to the following general procedure:

Cyclic comonomer (all monomers were passed over a drying column before entering the reactor) and a quantity of 10% methylalumoxane (MAO) in toluene solution (purchased from Ethyl Corporation) were introduced through a septum inlet into a two liter Zipperclave reactor equipped with a paddle stirrer, an external water jacket for temperature control and regulated supply of dry nitrogen. The contents of the reactor were then stirred for 5 minutes. The transition metal compound was dissolved in toluene and introduced into the reactor under nitrogen pressure. 10 psi(69 kPa) of hydrogen was introduced into the reactor in example 5. About 400 ml or 800 ml of liquid propylene was introduced to the reactor, which was then heated. The contents were stirred at 1000 rpm and allowed to run for 30 minutes (except for example 7 which ran for 75 minutes). The polymerization was terminated by rapidly venting and cooling the system. The polymer product was recovered by evaporating the solvent under a stream of nitrogen and then rigorously drying the polymer in vacuo at about 50° C. for over 18 hours.

The dicylcopentadiene (DCPD) used was a 95% solution purchased from Aldrich and purified through a column capable of removing the t-butylcatachol inhibitor.

The results and individual run conditions are summarized in Table 1 below.

TABLE 1

| Ex | TMC | TMC/MAO (mg)/(ml) | $C_3$ (ml) | Comonomer | $M_n$ | Mol % DCPD | MWD $M_w/M_n$ | Temp (°C.) | Yield (g) |
|---|---|---|---|---|---|---|---|---|---|
| 1 | D | 4.7/10 | 400 | 10 ml DCPD | 620 | 7.6 | 1.9 | 60 | 36 |
| 2 | E | 5.2/3 | 400 | 10 ml DCPD | 520 | 20.7 | 1.8 | 60 | 11 |
| 3 | G | 6.1/3 | 400 | 10 ml DCPD | 840 | 11.9 | 2.0 | 60 | 24 |
| 4 | F | 5.5/3 | 400 | 10 ml DCPD | 470 | 22.0 | 1.5 | 60 | 11 |
| 5* | B | 2.5/6 | 800 | 20 ml DCPD | 600 | 6.7 | 2.5 | 80 | 30 |
| 6 | B | 2.5/6 | 800 | 20 ml DCPD | 1200 | 5.3 | 2.3 | 80 | 30 |
| 7 | C | 2.5/3 | 400 | 10 ml DCPD 2 ml NB | 500 | NA | 2.4 | 80 | 45 |
| 8 | D | 4.7/3 | 400 | 10 ml DCPD | 530 | 14.5 | 2.1 | 60 | 5 |
| 9 | C | 4.9/6 | 800 | 10 ml DCPD | 550 | 5.5 | 2.0 | 80 | 53 |

NB = norbornene, DCPD = dicyclopentadiene, TMC = transition metal compound, MAO = methylalumoxane, NA = not available
*10 psi (69 kPa) of hydrogen added into the reactor

BLENDS OF THE TACKIFIERS PRODUCED IN EXAMPLES 1–4

The compositions produced above were combined with VECTOR™ 4111 which is a styrene-isoprene-styrene (SIS) block copolymer produced by Dexco Polymers having a weight average molecular weight of greater than 100,000. For more information on DEXCO Cpolymers see the Adhesive Age article by Jean Tancrede printed in the June 1994 volume, which is incorporated by reference. 100 phr of SIS block copolymer and 100 phr of the tackifier produced in examples 1–4 above were solution blended then tested for adhesive properties. The data are reported in Table 2.

TABLE 2

| Formulation, phr | Tackifier 1 | Tackifier 2 | Tackifier 3 | Tackifier 4 |
|---|---|---|---|---|
| VECTOR ™ 4111 | 100 | 100 | 100 | 100 |
| PP/DCPD tackifier | 100 | 100 | 100 | 100 |
| Mole % DCPD in tackifier | 7.6 | 20.7 | 11.9 | 22.0 |
| $M_n$, Tackifier | 620 | 520 | 840 | 470 |
| Blend properties | | | | |
| Peel, Nt/in | 0.1 | 3.0 | 1.0 | 5.5 |
| (lb/in) | (0.02) | (0.70) | (0.22) | (1.24) |
| Loop, Nt/in | 0.2 | 2.3 | 1.1 | 2.7 |
| (lb/in) | (0.04) | (0.52) | (0.25) | (0.61) |
| Holding Power, 1" × 1" × 1 kg | 100+ hours | 100+ hours | 0 hours | 100+ hours |
| SAFT, °C. | | 89 | | 79 |

PP/DCPD = POLYPROPYLENE-DICYCLOPENTADIENE COPOLYMER
Nt/in = newtons per inch; lb/in = pounds per inch The characterization data for examples 10–42 are presented in Tables 3–6.

EXAMPLE 10

A 1-L, stainless steel zipperclave polymerization reactor was purged with nitrogen and charged with 200 ml hexane, 20 g (0.15 mole, 43.5 ml of a 57.5 wt. % solution in pentane) dicyclopentadiene, and 0.32 mmole of triethyl aluminum (200 µl of a 25 wt. % solution in heptane). Bulk propylene (50 ml, 0.62 mole) was added and the contents were stirred until the reactor temperature reached 60° C. Simultaneously, 30 mg (0.07 mmole) rac-dimethylsilyl-bis(tetrahydroindenyl) zirconium dimethyl was pre-activated with 60 mg (0.07 mmole) dimethylanilinium tetrakis(pentafluorophenyl) boron in 2 ml toluene. The activated catalyst was loaded in a stainless steel catalyst tube and charged into the reactor with a 50 ml hexane rinse using high-pressure nitrogen. The polymerization was allowed to proceed for 15 min at which time the reactor was vented and the polymerization quenched with a small amount of isopropanol. The product was isolated by filtering to remove any catalyst residues, concentrating the hexane solution on a rotary evaporator, and removing the unreacted dicyclopentadiene under vacuum (0.2–5 torr, 180° C., nitrogen sparge). Approximately 0.1 wt. % stabilizer (Irganox 1010) was added to prevent degradation during the vacuum distillation step. The yield was 7.5 g.

EXAMPLE 11

Example 10 was repeated, except that the reactor temperature was maintained at 80° C. The yield was 6.7 g.

EXAMPLE 12

Example 11 was repeated except that a more highly purified catalyst and cocatalyst were used. The yield was 20.7 g.

EXAMPLE 13

Example 10 was repeated except that 15 mg (0.035 mmole) rac-dimethylsilyl-bis(tetrahydroindenyl)zirconium dimethyl was preactivated with 30 mg (0.035 mmole) dimethylanilinium perfluorotetraphenyl boron in 2 ml toluene and 100 ml (1.24 mole) and liquid propylene was used. The yield was 3.3 g.

EXAMPLE 14

The procedure described in Example 10 was followed except 15 mg (0.035 mmole) rac-dimethylsilyl-bis(tetrahydroindenyl) zirconium dimethyl was preactivated with 30 mg (0.035 mmole) dimethylanilinium perfluorotetraphenyl boron in 2 ml toluene. The yield was 2.8 g.

EXAMPLE 15

The procedure described in Example 10 was followed except a more highly purified catalyst and cocatalyst were used. The yield was 12.7 g.

EXAMPLE 16

The procedure described in Example 10 was followed except the reactor temperature was maintained at 90° C. The yield was 30 g.

EXAMPLE 17

The procedure described in Example 10 was followed except 0.64 mmole of triethyl aluminum (400 μL of a 25 wt. % solution in heptane) was used. The yield was 14.0 g.

EXAMPLE 18

The procedure described in Example 10 was followed except 0.32 mmole of triisobutyl aluminum (320 μL of a 25 wt. % solution in toluene) was used. The yield was 15.1 g.

EXAMPLE 19

The procedure described in Example 10 was followed except 0.64 mmole of triisobutyl aluminum (640 μL of a 25 wt. % solution in toluene) was used. The yield was 16.3 g.

EXAMPLE 20

The procedure described in Example 10 was followed except that the propylene was added in small aliquots. In addition, 0.50 mmole of triisobutyl aluminum (500 μl of a 25 wt. % solution in toluene) was used and the reactor temperature was 80° C. The yield was 20.9 g.

EXAMPLE 21

The procedure described in Example 10 was followed except 0.50 mmole of triisobutyl aluminum (500 μl of a 25 wt. % solution in toluene) was used and the reactor temperature was 80° C. The yield was 26.6 g.

EXAMPLE 22

The procedure described in Example 10 was followed except 0.50 mmole of triisobutyl aluminum (500 μl of a 25 wt. % solution in toluene) was used. The yield was 15.5 g.

EXAMPLE 23

Example 22 was repeated. The yield was 16.0 g.

EXAMPLE 24

The procedure described in Example 10 was followed except 0.50 mmole of triisobutyl aluminum (500 μL of a 25 wt. % solution in toluene) and 25 ml (0.31 mole) propylene were used and the reactor temperature was 80° C. The yield was 8.7 g.

EXAMPLE 25

Example 24 was repeated. The yield was 7.7 g.

EXAMPLE 26

The procedure described in Example 20 was followed except the reactor pressure was increased to 310 psig (2140 kPa) using nitrogen.

EXAMPLE 27

Example 16 was repeated. The yield was 30.3 g.

EXAMPLE 28

The procedure described in Example 10 was followed except 0.50 mmole of triisobutyl aluminum (500 μl of a 25 wt. % solution in toluene) and 25 ml (0.31 mole) propylene was used and the reactor temperature was 90° C. The yield was 6.9 g.

EXAMPLE 29

The procedure described in Example 10 was followed except 20 mg (0.08 mmole) bis(cyclopentadienyl)zirconium dimethyl was preactivated with 63 mg (0.08 mmole) of dimethylanilinium perfluorotetraphenyl boron in 2 ml toluene. Similarly, 0.50 mmole of triisobutyl aluminum (500 μl of a 25 wt. % solution in toluene) and 25 ml (0.31 mole) propylene was used and the reactor temperature was 80° C. The yield was 3.3 g.

EXAMPLE 30

The procedure described in Example 29 was followed except 50 ml (0.62 mole) propylene was used. The yield was 9.2 g.

EXAMPLE 31

The procedure described in Example 27 was followed except the reaction time was 5 min. The yield was 15.4 g.

EXAMPLE 32

The procedure described in Example 29 was followed except the reaction time was 30 min. The yield was 5.5 g.

EXAMPLE 33

Example 32 was repeated. The yield was 4.8 g.

EXAMPLE 34

The procedure described in Example 29 was followed except the reaction time was 30 min and 0.32 mmole of triethyl aluminum (200 μl of a 25 wt. % solution in heptane) was used. The yield was 7.3 g.

EXAMPLE 35

Example 34 was repeated. The yield was 7.9 g.

EXAMPLE 36

The procedure described in Example 29 was followed except 0.32 mmoles of triisobutyl aluminum (320 µl of a 25 wt. % solution in toluene) was used and the polymerization was carried out for 30 min. The yield was 13.1 g.

EXAMPLE 37

A sample of the product made in Example 36 was dissolved in octane and hydrogenated in a lab scale reactor by passing the solution over an activated nickel-tungsten catalyst at a flow rate of 5 ml/h at 250° C. under 400 psig (2760 kPa) of hydrogen flowing at a rate of 25 scc/min. The catalyst (6% NiO, 22% $WO_3$) was supported on alumina and activated by sulfiding at 320° C. The product was isolated by heating to 80°–90° C. under vacuum (0.2 torr(28Pa)) to remove the residual solvent. The hydrogenated structure was confirmed by the disappearance of the olefinic signals in the $^1H$ NMR.

EXAMPLE 38

Example 36 was repeated The yield was 9.0 g.

EXAMPLE 39

The procedure described in Example 29 was followed except 0.2 g (0.15 mole) norbornene was used as the comonomer and no aluminum alkyl was used as a scavenger. The yield was 3.8 g.

EXAMPLE 40

The procedure described in Example 10 was followed except 0.50 mmole of triisobutyl aluminum (500 µL of a 25 wt. % solution in toluene) and 25 ml (0.31 mole) propylene was used and the reactor temperature was 90° C. Norbornene (14.2 g, 0.15 mole) was used as the comonomer. The yield was 1.4 g.

EXAMPLE 41

The procedure described in Example 29 was followed except the reaction time was 30 min and 0.32 mmole of triethyl aluminum (200 µl of a 25 wt. % solution in heptane) was used. Ethylidene norbornene was used as the comonomer and the yield was 5.3 g.

EXAMPLE 42

Example 41 was repeated. The yield was 6.0 g. Several resins were then blended with a block copolymer of styrene-isoprene-styrene availabe from DEXCO Polymers under the trade name VECTOR 4111™ into the following PSA Formulation:

| | |
|---|---|
| Vector 4111 | 100 parts |
| Tackifier resin | 100 parts |
| Flexon 766 | 20 parts |
| IRGANOX 1010 ™ | 1 part. |

The tackifier and the block copolymer were solution blended using toluene (40 wt. % solids). The resulting blends were cast onto 1.5 mil (38.1 mm) MYLAR™ film and the solvent evaporated to give a 1.5 mil (38.1 mm) dry layer of the formulated adhesive.

Table 3 also reports properties of the tackifiers blended with the block copolymer as described above.

TABLE 3

| | 20 | 21 | 26 | 27 | 28 | 29 | 30 | 10 | 12 | 11 |
|---|---|---|---|---|---|---|---|---|---|---|
| | | | | Resin Properties | | | | | | |
| GPC | | | | | | | | | | |
| Mw | 2107 | 1975 | 1864 | 1402 | 1529 | 1201 | 1317 | 3130 | 2039 | 2065 |
| Mn | 1055 | 971 | 899 | 688 | 844 | 541 | 627 | 1446 | 1027 | 1048 |
| Mz | 3877 | 3883 | 3416 | 2530 | 2505 | 3827 | 3262 | 5516 | 3561 | 3465 |
| Tg (°C.) | 38 | 22 | 14 | 4 | 52 | 58 | 42 | 53 | 48 | 53 |
| mol % DCPD | 31 | 29 | 26 | 26 | 37 | 42 | 33 | 32 | 30 | 34 |
| soft pt. (°C.) | 78 | 76 | 56 | 46 | — | — | — | — | — | — |
| | | | | Blend properties | | | | | | |
| Rolling Ball Tack (cm) | 30+ | 30+ | 30+ | 30+ | 30+ | 30+ | 30+ | 22 | 30+ | 23 |
| 180° Peel (lb/in) | 0.20 | 0.65 | 0.65 | 0.20 | 0.07 | 1.82 | 1.47 | 0.1 | 0.1 | 0.1 |
| Loop Tack (lb/in) | 0.03 | 0 | 0 | 0 | 0.05 | 0.75 | 0 | — | — | — |
| SAFT (°F.) | 169 | 161 | 158 | 128 | 182 | 197 | 189 | 178 | 173 | 183 |

TABLE 4

| | 13a | 14 | 15 | 16 | 17 | 18 | 19 |
|---|---|---|---|---|---|---|---|
| $GPC^a$ | | | | | | | |
| Mw | 4963 | 4071 | 4180 | 2390 | 4280 | 4449 | 4404 |
| Mn | 2760 | 2426 | 2330 | 1410 | 2398 | 2489 | 2465 |
| Mz | 7792 | 6098 | 6409 | 3780 | 6688 | 6977 | 6878 |
| Tg (°C.) | 46 | 57 | 57 | 12 | 53 | 55 | 57 |
| mol % DCPD | 27 | 34 | 31 | 24 | 32 | 35 | 34 |

TABLE 5

| | 22 | 23 | 24 | 25 | 32 | 33 | 34 | 35 |
|---|---|---|---|---|---|---|---|---|
| GPC | | | | | | | | |
| Mw | 3213 | 3121 | 1953 | 1978 | 1116 | 1038 | 971 | 1108 |
| Mn | 1500 | 1471 | 992 | 1020 | 505 | 499 | 456 | 514 |
| Mz | 5763 | 5546 | 3322 | 3367 | 3523 | 2823 | 2966 | 3121 |

TABLE 5-continued

|  | 22 | 23 | 24 | 25 | 32 | 33 | 34 | 35 |
|---|---|---|---|---|---|---|---|---|
| Tg (°C.) | 55 | 52 | 67 | 59 | 57 | 67 | 64 | 71 |
| mol % DCPD | 31 | 31 | 36 | 36 | 50 | 42 | 41 | 42 |
| 180° Peel (lb/in) |  |  |  |  | 1.87 | 2.18 | 2.97 | 1.75 |
| Loop Tack (lb/in) |  |  |  |  | 1.22 | 1.38 | 1.00 | 0.95 |
| SAFT (°F.)/(°C.) |  |  |  |  | 197 | 194 | 190 | 196 |

TABLE 6

|  | 31 | 38 | 37 | 36 | 39 | 40 | 41 | 42 |
|---|---|---|---|---|---|---|---|---|
| GPC |  |  |  |  |  |  |  |  |
| Mw | 1690 | 1172 |  | 1367 | 702 | 1454 | 1070 | 1114 |
| Mn | 909 | 487 |  | 588 | 376 | 652 | 570 | 582 |
| Mz | 2910 | 3050 |  | 4278 | 1131 | 2366 | 1759 | 1863 |
| Tg (°C.) | 34 | 38 | 37 | 66 | 43 | 20 | 56 | 62 |
| mol % DCPD | 31 | 33 | n/a[b] | 30 | 60[c] | 41[c] | 74[d] | 69[d] |
| 180° Peel (lb/in) |  |  |  | 1.60 |  |  | 3.80 | 4.00 |
| Loop Tack (lb/in) |  |  |  | 1.70 |  |  | 5.60 | 3.50 |
| SAFT (°F.)/(°C.) |  |  |  | 195 (91) |  |  | 198/ (92) | 201/ (94) |

[b]Hydrogenated PP/DCPD sample
[c]Norbornene
[d]5-ethylidene-2-norbornene

All references described above, including testing procedures, are incorporated by reference in their entirety. As is apparent from the foregoing description, the materials prepared and the procedures followed relate to specific preferred embodiments of the broad invention. It is apparent from the foregoing general description and the specific embodiments that, while forms of the invention have been illustrated and described, various modifications can be made without departing from the spirit and scope of this invention. Accordingly, it is not intended that the invention be limited thereby.

We claim:

1. A process to produce a tackifier, said process comprising contacting an alpha-olefin, a cyclic olefin, and a catalyst comprising a cyclopentadienyl transition metal compound and a non-coordinating anion or an alumoxane in a polymerization reactor under tackifier polymerization conditions to produce the tackifier, wherein said tackifier produced is amorphous having an $M_n$ in the range of from 300 to 2000, a $T_g$ in the range of from 0° C. to 100° C., and a cyclic olefin content in the range of from 20 mole percent to 95 mole percent.

2. The process of claim 1 wherein the tackifier produced has a comonomer content in the range of from 20 mole percent to less than 80 mole percent.

3. The process of claim 1, wherein the alpha-olefin is propylene and the cyclic olefin is dicyclopentadiene, 5-ethylidene-2-norbornene, norbornene, or 5-vinyl-2-norbornene.

4. The process of claim 1 wherein the tackifier produced has an Mn of 1200 or less.

5. The process of claim 1 wherein the tackifier produced has an Mn of 750 or less.

6. The process of claim 1 wherein the tackifier produced has a Tg of 20° C. or more.

7. The process of claim 1 wherein the tackifier produced comprises about 35 to about 95 mole % of the cyclic olefin.

8. The process of claim 1 wherein the cyclopentadienyl transition metal compound is selected from the group consisting of:
dimethylsilanyl bis(methylcyclopentadienyl)zirconium dichloride;
dimethylsilanyl bis(cyclopentadienyl)zirconium dichloride;
bis(methylcyclopentadienyl)zirconium dichloride; bis(cyclopentadienyl)zirconium dichloride;
dimethylsilanyl bis(tetrahydroindenyl)zirconium dichloride;
rac-dimethylsilyl-bis(tetrahydroindenyl)zirconium dimethyl;
dimethylsilanyl bis(methylcyclopentadienyl)zirconium dimethyl;
dimethylsilanyl bis(cyclopentadienyl)zirconium dimethyl;
bis(methylcyclopentadienyl)zirconium dimethyl; bis(cyclopentadienyl)zirconium dimethyl;
$Me_2Si[Me_4CpN(C_{12}H_{23})]TiCl_2$; and
$CpZr(OC(CH_3)_3)Cl_2$.

9. The process of claim 1 wherein the alumoxane is methylalumoxane and the non-coordinating anion is dimethylanilinium tetrakis(pentafluorophenyl) boron.

10. The process of claim 1 wherein the alpha-olefin is a $C_2$ to $C_{20}$ alpha-olefin.

11. The process of claim 1 wherein the cyclic olefin is selected from the olefins represented by the following formulae:

1)

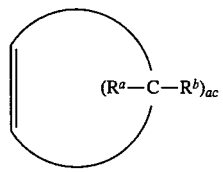

2)

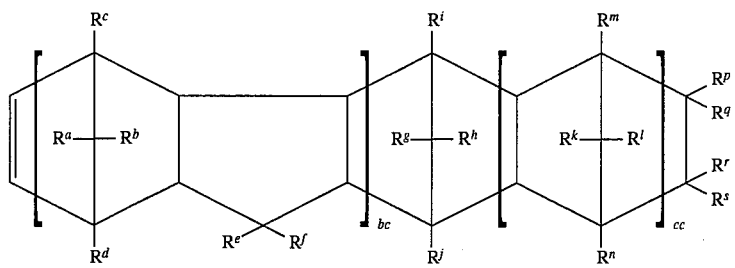

3)

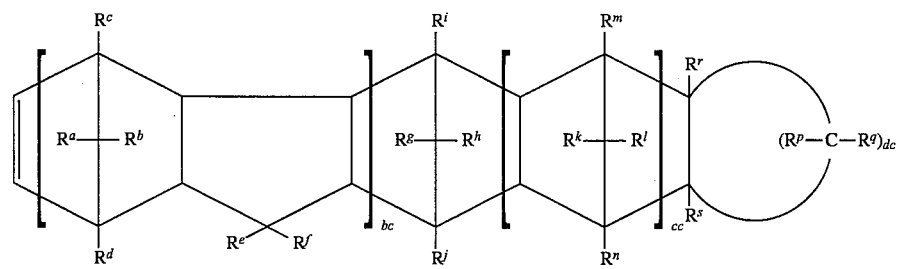

4)

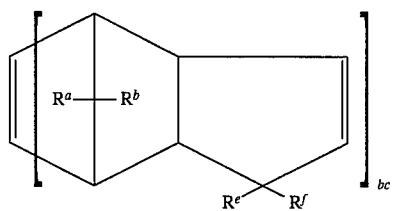

wherein each $R^a$ through $R^s$ is independently hydrogen, halogen, hydrocarbyl, or halohydrocarbyl; ac and dc are integers of 2 or more, and bc is an integer greater than 0 and cc is an integer of 0 or more.

12. The process of claim 1 wherein the cyclic olefin is selected from the group consisting of: dicyclopentadiene, cyclopentadiene, norbornene, 5-ethylidene-2-norbornene, ethylene norbornene, methylcyclopentadiene, and cyclopentadiene.

13. An amorphous tackifier having a Tg in the range of from 0° C. to 100° C., a Mn in the range of from 300 to 2000, said tackifier consisting of alpha-olefin monomers and cyclic olefin comonomers, said comonomers present in the tackifier in the range of from 20 mole percent to 95 mole percent.

14. The tackifier of claim 13 wherein the comonomer content in the range of from 20 mole percent to less than 80 mole percent.

15. The tackifier of claim 13 wherein the tackifier has a Tg of 30° C. or greater and a Mn of 1200 or less.

16. The tackifier of claim 15 wherein the tackifier has a Mn of 750 or less and a Saybolt color of 15 or more.

17. An adhesive comprising a base polymer and a tackifier consisting of alpha-olefins and about 20 mole % to about 95 mole % of cyclic olefins, said tackifier being amorphous and having a Tg in the range of from 0° C. to 100° C. and a Mn in the range of from 300 to 2000.

18. The adhesive of claim 17, wherein the base polymer is selected from the group consisting of: polyethylene, polypropylene, ethylene-vinyl acetate, polyvinyl chloride, natural rubber, nitrile rubber, polychloroprene rubber, ethylene-propylene rubber, ethylene-propylene-diene termonomer rubber, butyl rubber, and polystyrene.

19. The adhesive of claim 17, wherein the base polymer is selected from the group consisting of: styrenic block copolymers.

20. The adhesive of claim 17, wherein the base polymer is selected from the group consisting of: block copolymers comprising styrenic blocks and diene blocks in an A—B—A configuration, where A is poly(styrene) or poly(substituted styrene) block and B is a polymer of a $C_3$ to $C_{30}$ diene.

21. The adhesive of claim 17, wherein the base polymer is a styrene-isoprene-styrene block copolymer.

22. The adhesive of claim 17 wherein the alpha-olefin is a $C_2$ to $C_{20}$ alpha-olefin and the cyclic olefin is selected from the olefins represented by the following formulae:

1)

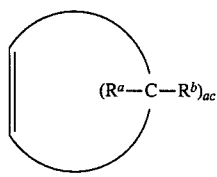

2)

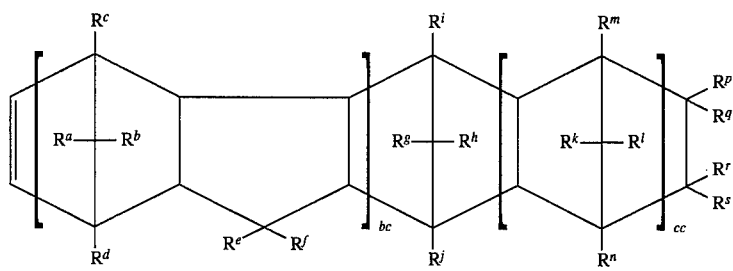

3)

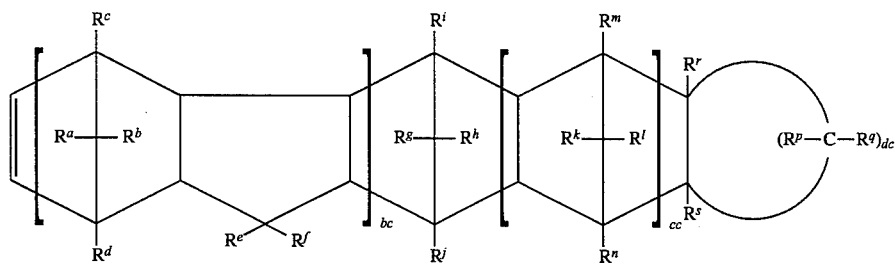

4)

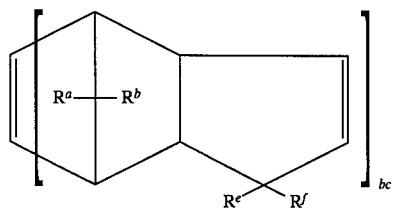

wherein each $R^a$ through $R^s$ is independently hydrogen, halogen, hydrocarbyl, or halohydrocarbyl; ac and dc are integers of 2 or more, and bc is an integer greater than 0 and cc is an integer of 0 or more.

23. An adhesive comprising a base polymer and a tackifier comprising alpha-olefin and about 10 mole % to about 95 mole % of cyclic olefin having a Tg greater than about 0° C. and an Mn of 2000 or less wherein the alpha-olefin is propylene and the cyclic olefin is dicyclopentadiene, norbornene, or 5-ethylidene-2-norbornene.

24. The adhesive of claim 17 wherein the tackifier has been hydrogenated.

25. The adhesive of claim 23 wherein the tackifier has been hydrogenated.

26. The adhesive of claim 17 wherein the tackifier is present at 50 to 175 parts by weight per 100 parts of the base polymer.

27. The tackifier of claim 13 wherein the cyclic olefin is a trimer or a dimer of the cyclic olefin.

28. The adhesive of claim 17 further comprising oil or plasticizer.

29. The adhesive of claim 17 further comprising oil or plasticizer present at levels up to 30 phr.

30. The adhesive of claim 17 wherein the base polymer is natural rubber, ethylene vinyl acetate, butyl rubber.

31. A pressure sensitive adhesive comprising the adhesive of claim 17.

32. A hot melt adhesive comprising the adhesive of claim 17.

33. A hot melt pressure sensitive adhesive comprising the copolymer of claim 17.

* * * * *